Nov. 27, 1956
R. E. LITTMAN
2,771,925
SAW BLADE HOLDER
Filed Aug. 15, 1955
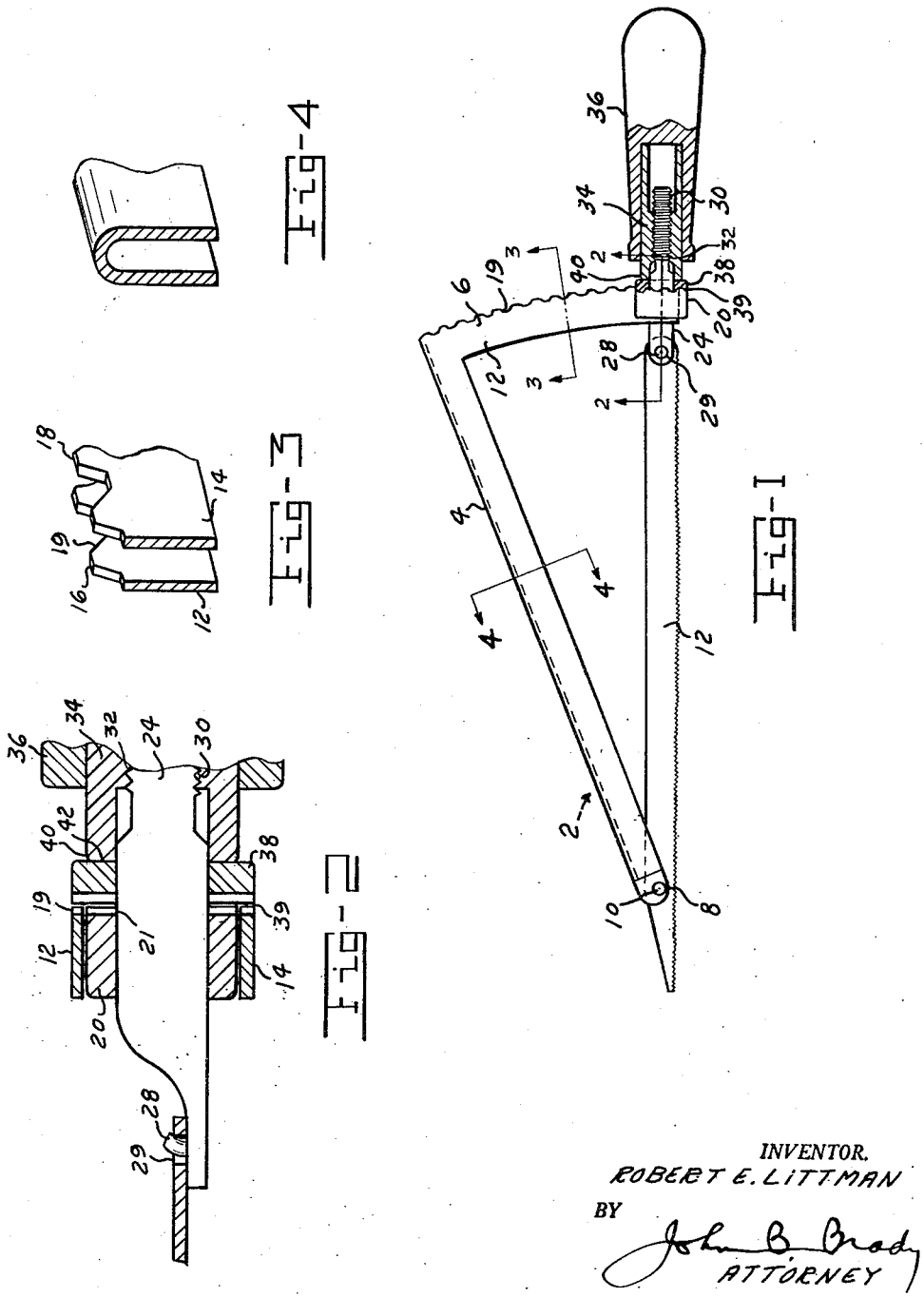
INVENTOR.
ROBERT E. LITTMAN
BY
ATTORNEY United States Patent Office 2,771,925
Patented Nov. 27, 1956

2,771,925
SAW BLADE HOLDER
Robert E. Littman, Flushing, N. Y.
Application August 15, 1955, Serial No. 528,287
1 Claim. (Cl. 145—108)

My invention relates to that class of devices known as hack saws and more particularly to the frames therefor.

It is well known that the versatility of a hack saw or coping saw or the like is limited generally by the size of the frame which holds the cutting blade. For instance, in the ordinary hack saw, a U frame is employed to hold the blade which necessitates the presence of sufficient room in the working area to permit the passage back and forth of the frame as well as the blade during the cutting operation.

It will be clear that if some means could be provided to reduce the size of the frame holding the hack saw or the coping saw blade, a greater versatility would be rendered to the tool. I am aware that this problem has long been present in the industry and that some of the attempts to solve the problem include providing a frame which is U shaped in cross section wherein a portion of the cutting blade is permitted to be recessed in the frame. However, to my knowledge, there has been no means before my discovery for permitting the blade to be wholly recessed within the backing of the frame and yet permitting the frame to be extended—if desired—and the blade thereby uncovered.

It is the principal object of my invention to provide a means for mounting a hack saw or coping saw in such a manner that the blade is able to be selectively recessed within the backing of the frame.

It is another object of my invention to provide a hack saw or coping saw frame wherein the frame is variable as to its mounting adjustment.

It is a further object of my invention to provide a hack saw or coping saw frame wherein the variable adjustment of the frame is achieved by ratchet teeth on the outer edge of the rear member of the frame which is formed in an arc, being engaged and held in position by turning the handle on a shuttle which also holds one end of the hack saw or coping saw.

My means of accomplishing the foregoing objects may be more readily apprehended by having reference to the accompanying drawings in which:

Figure 1 is a side elevational view, partly in section, showing my invention;

Figure 2 is a sectional view taken on lines 2—2 of Figure 1;

Figure 3 is a perspective view, partly in section, taken along lines 3—3 of Figure 1;

Figure 4 is a perspective view, partly in section, taken along lines 4—4 of Figure 1.

As shown in the drawings, I provide a frame indicated generally as 2 which has a backing member 4 and a rear member 6. The backing member 4 is U shaped in cross section as shown in Figure 4 and has a mooring pin 10 adjacent its forward end to accommodate a hole 8 in a cutting blade 12. The rear member 6 of the frame 2 is arcuate in form with its arc being centered for convenience at the mooring pin 10. The rear member 6 is comprised of a pair of parallel scarf mounts 12 and 14 each extending radially from one side of the backing member 4. The outer edges 16 and 18 of the scarf mounts 12 and 14 carry ratchet teeth 19 which are aligned with ratchet teeth 21 on either side thereof. A washer 20 is adapted to afford space support between the scarf mounts 12 and 14. The washer 20 is mounted on a shuttle 24. The forward end of the shuttle 24 carries a mooring pin 28 to accommodate a hole 29 in the blade 12. The rear portion of the shuttle 24 carries threads 30 which screw into threads 32 of a sleeve 34 that is swedged or otherwise mounted into a handle 36. I mount a washer 38 on the shuttle 24. This washer 38 has a flat face 42 which backs against the outer edge 40 of the sleeve 34. The opposite face of the washer 38 has grooves 39 to engage the ratchet teeth 19 in the scarf mounts 12 and 14 as well as ratchet teeth 21 of the washer 20.

It will be clear that by rotating the handle 36 I can loosen the washer 38 from engagement with the ratchet teeth 19 to permit the rear member 6 of the frame 2 to be swung in its arc to any desired position and that by reversing the rotation of the handle 36, the ratchet teeth 19 of the rear member 6 and the ratchet teeth 21 of the washer 20 will register with the grooves 39 of the washer 38, thereby holding the frame 2 in the selected position during the operation of the tool. It will also be clear that if it is desired, the entire blade 12 can be substantially recessed within the backing member 4 to permit the narrowest possible space for operation of the whole blade.

I have thus provided a frame which reduces the vibration of the blade during operation as well as having provided an extremely simple and useful frame of unique construction, permitting a wide variety of adjustment of the backing frame.

Having described my invention what I regard as new and desire to protect by Letters Patent is:

A means to hold a hack saw blade or the like comprising a frame and a handle, said frame having a backing member and an accurate rear member, said backing member being U shaped in cross section and adapted to accommodate a hack saw blade, said backing member having means adjacent its forward end to hold one end of a hack saw blade, said arcuate rear member being formed of a pair of arms extending radially from said backing member, serrations on the outer edges of said arms, a threaded shuttle extending between said arms, said handle threadedly mounted on one end of said shuttle, means adjacent the other end of said shuttle to hold the other end of a hack saw blade, a washer having a radially serrated face slidably mounted on said shuttle and adapted to engage the serrations on said arms, said washer longitudinally movable in one direction on said shuttle by said handle when said handle is rotated around said shuttle, said arms adapted to slide tangentially past said shuttle whereby when a hack saw blade or the like is mounted between the forward end of said backing member and said other end of the shuttle, the backing member may be moved so that the rear member travels in an arc and may be selectively held in position by turning the handle when the serrations on the arms are in registry with the serrations on the washer.

References Cited in the file of this patent
UNITED STATES PATENTS

| 1,245,545 | Williams | Nov. 6, 1917 |
| 1,540,201 | Voltz | June 2, 1925 |
| 2,173,365 | Kessler | Sept. 19, 1939 |
| 2,514,880 | Leatherman | July 11, 1950 |

FOREIGN PATENTS

| 491,636 | Canada | Mar. 31, 1953 |